United States Patent Office.

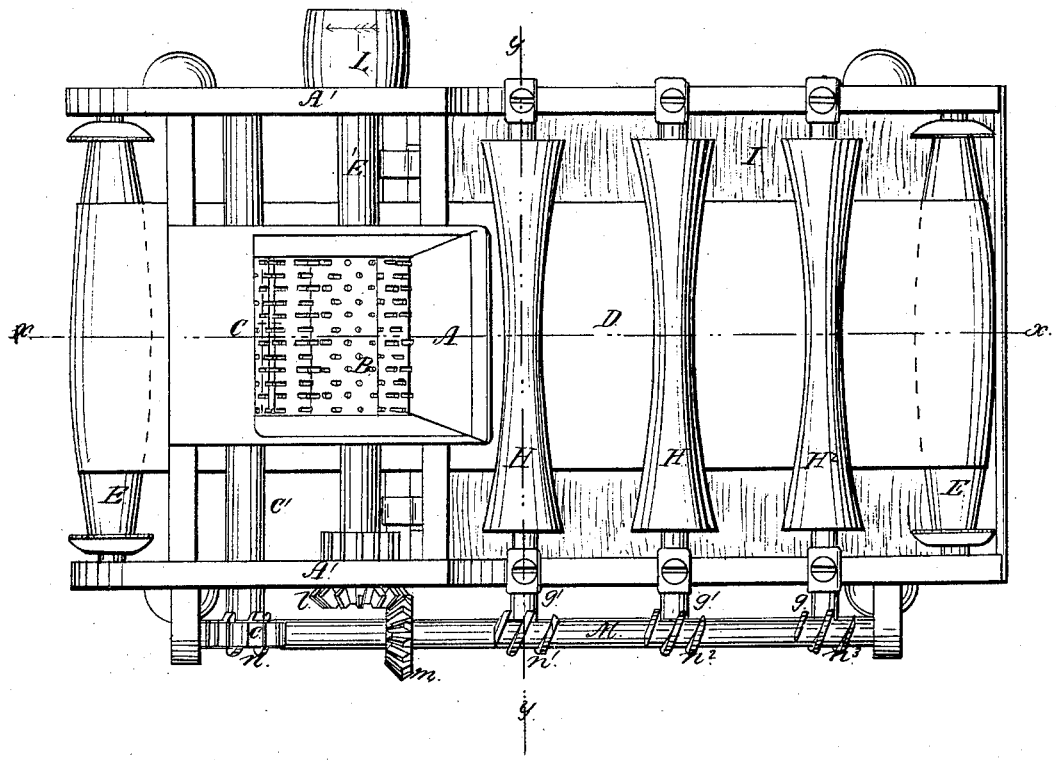

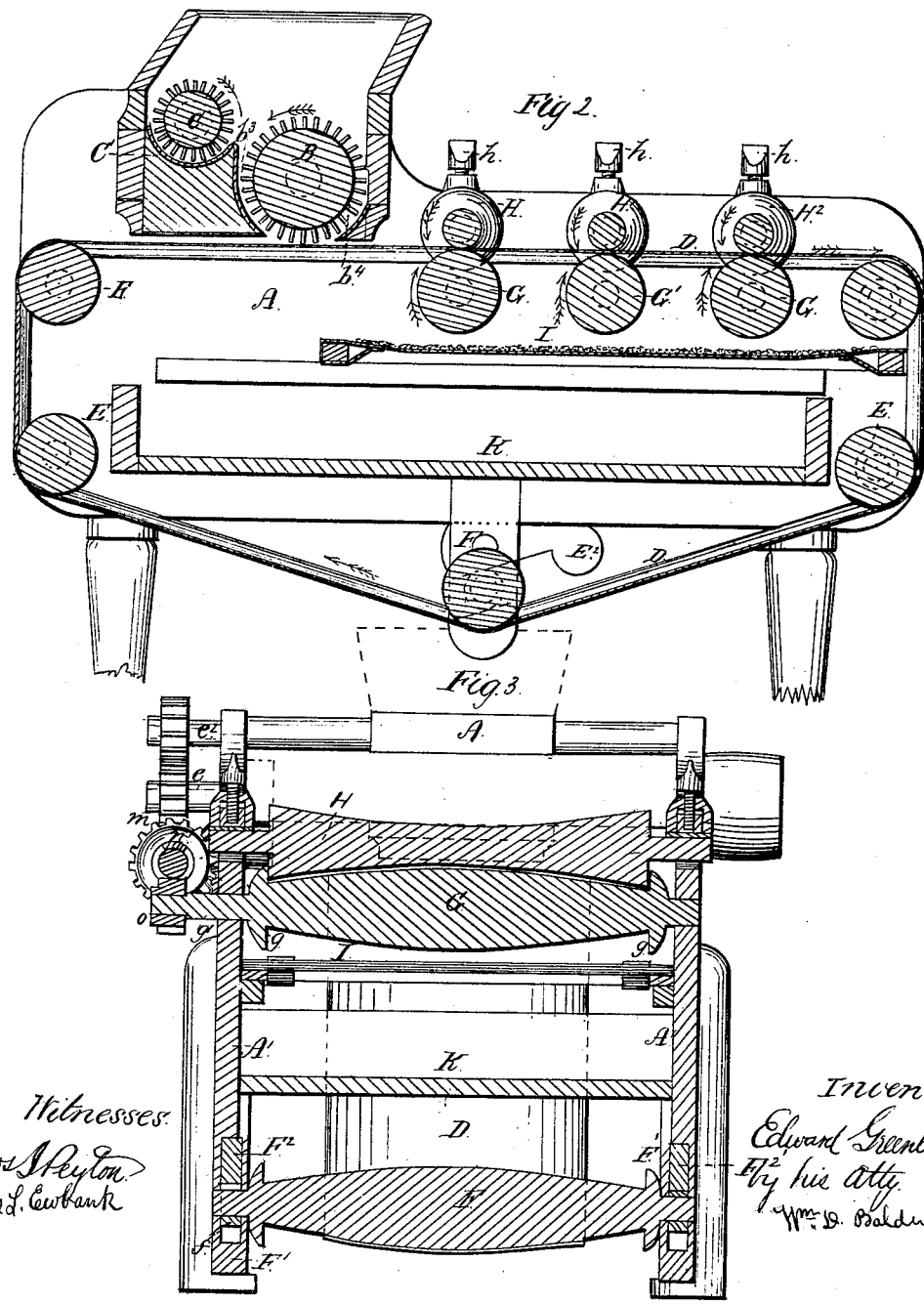

EDMUND GREENLEE, OF RUNDELLS, PENNSYLVANIA.

Letters Patent No. 86,391, dated February 2, 1869.

IMPROVED FRUIT-MILL.

The Schedule referred to in these Letters Patent and making part of the same.

*To all whom it may concern:*

Be it known that I, EDMUND GREENLEE, of Rundells, in the county of Crawford, and State of Pennsylvania, have invented certain new and useful Improvements in Machinery for Grinding Fruits, and expressing the juice therefrom, of which the following is a full, clear, and exact description, reference being had to the accompanying drawings, which make part of this specification, and in which—

Figure 1 represents a plan or top view of my improved machine.

Figure 2 represents a vertical longitudinal section through the same, at the line $x\ x$ of fig. 1.

Figure 3 represents a vertical transverse section through the same, at the line $y\ y$ of fig. 1.

The object of my invention is effectively to reduce apples or other fruit to pulp or pomace, and to extract the juice therefrom; to which end, The invention herein claimed consists in certain novel devices and combinations of mechanism hereinafter set forth.

The apples, or other fruit to be ground, are poured into a hopper, A, and cut up by spiked rollers, B C, revolving in the direction indicated by the arrows.

The smaller cylinder C revolves in a concave, C', arranged beneath it, and the larger one, B, revolves between two concaves, $b^3\ b^4$, arranged, one on each side of it, as shown in fig. 2.

The pomace escapes through the bottom of the hopper and falls upon the centre of an endless or travelling-band, D, of cloth or other suitable material.

This apron runs around four cigar-shaped flanged rollers, E, turning in suitable bearings in the frame A', and under a central tightening-roller, F, turning in boxes $f$ in vertically-slotted down-hanging arms, $F^1$, provided with tightening-wedges, $F^2$, by which the tension of the belt may be regulated.

The peculiar form of the rollers aids in keeping the apron smooth-stretched.

After escaping from the hopper, the pomace is carried by the apron between several pairs of rollers, G H, $G^1\ H^1$, $G^2\ H^2$, by which the juice is expressed.

These rollers are of the peculiar form shown in the drawings.

The upper ones taper from each end toward the centre, so that a central longitudinal section thereof would be of a double-concave form, and are capable of being adjusted vertically by set-screws $h$.

The lower rollers are of a cigar shape or double-convex form in longitudinal section, and provided at each end with flanges $g$, which overlap the ends of the upper rollers.

The rollers may be so adjusted as to give pressure to each pair greater than that of the preceding pair, and thus express the juice better.

The pomace travels on the centre of the rollers, and, owing to the peculiar shape of the under rollers, the juice runs off sidewise, and is thus prevented from again being absorbed by the pomace, but is prevented by the overlapping flanges from escaping over the ends of the rollers.

The peculiar form of the rolls gives a greater pressure-surface than a cylindrical roll.

The expressed juice falls from the rollers upon a screen or frame, I, covered with straw, by which any impurities are strained off, and then falls into a vat, K, whence it may be conveyed to any proper receptacle by suitable pipes or troughs.

The pomace, after passing through the rollers, is dropped, at the end of the machine, into any proper receptacle.

The driving-power is applied from any suitable prime mover, by means of a band encircling a pulley, L, on the driving-shaft L' which carries the main cylinder B.

A spur-pinion, $l'$, on the opposite end of this shaft, drives a corresponding pinion on a short shaft beneath it.

A bevel-wheel, $l$, on this shaft, drives a corresponding pinion, $m$, on a longitudinal shaft, M, supported in suitable bearings outside of and parallel with the frame, and carrying worm-screws, $n\ n^1\ n^2\ n^3$.

The forward worm $n$ drives an idle-wheel, $c$, which drives a pinion, $c^2$, on the shaft $c^1$ of the feeding or auxiliary cutting-cylinder C, while the others drive pinions O on the shafts $g'$ of their respective lower rolls.

What I claim as my invention, and desire to secure by Letters Patent, is—

1. The combination of the endless belt with the cigar-shaped rollers E and tightening-roller F, arranged and operating as described.

2. The combination, substantially as described, of an endless belt, flanged cigar-shaped under rollers, and adjustable concave pressure-rollers, for the purposes specified.

3. The combination, substantially as set forth, of cutting-cylinders and an endless belt, travelling beneath the cylinders, with a series of flanged cigar-shaped rollers and concave rollers, arranged in pairs, with the belt passing between them.

4. The combination, substantially as set forth, of cutting-cylinders, an endless travelling-belt, curved pressure-rollers, and a straw screen, arranged for joint operation as specified.

In testimony whereof, I have hereunto subscribed my name.

EDMUND GREENLEE.

Witnesses:
W. D. GREENLEE,
M. D. GREENLEE.